April 22, 1941.  G. C. NORTH ET AL  2,239,397
STERILIZATION OF FOOD PRODUCTS
Filed Jan. 19, 1939
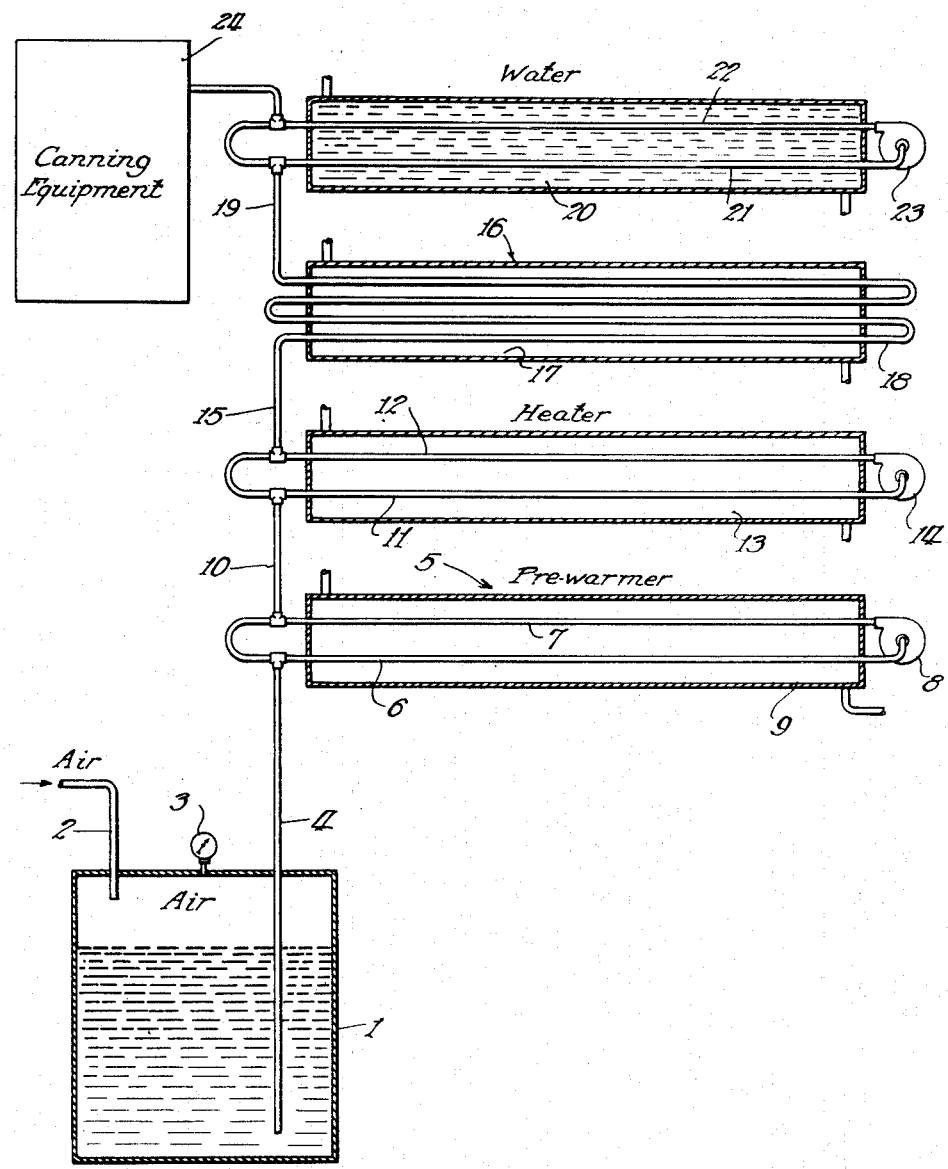
Inventors:
Gerald C. North,
Virgil C. Stebnitz, and
Alvin J. Atton.

Patented Apr. 22, 1941

2,239,397

UNITED STATES PATENT OFFICE 2,239,397

STERILIZATION OF FOOD PRODUCTS

Gerald C. North, Evanston, and Virgil C. Stebnitz and Alvin J. Alton, Chicago, Ill., assignors to Beatrice Creamery Company, Chicago, Ill., a corporation of Delaware Application January 19, 1939, Serial No. 251,662

4 Claims. (Cl. 99—212)

The present invention relates to the sterilization of food products such as milk, cream, ice cream mix, fruit juice and other liquids or semi-liquids.

The purpose of the present invention is to provide a method for high temperature, short time sterilization of the food products with sufficient flexibility so that it can be used for whole or concentrated liquid and semi-liquid products such as milk, cream, ice cream mix and the like, and will avoid the objectionable caramelized flavor now recognized as characteristic of evaporated milk.

The main limitation of the sterilized canned milk products is the cooked and caramelized flavor such products now have. The industry has been conscious of this limitation, and there are many examples of methods which have been employed in an endeavor to overcome the limitation. For example, at the present time the trend is to use higher temperatures and a shorter time for sterilization. In the sterilization with heat it is necessary to overcome the problem of burning-on of the milk solids to the surface of the heater. The solids which attach themselves to the metal surfaces to which the heat is transferred to the milk are sometimes referred to as "milk stone." The problem of heat stability of the product is also a matter which involves considerable difficulty. Unless the heating is done in the proper manner there is a tendency, when the product is left standing, for a fine curdy matter to settle out. There is also a tendency for the development of an aged flavor. Both of the above tendencies are believed to be in a measure due to failure in the past to consider properly the manner of applying the heat for sterilization, so that the final product would not have the characteristic distribution of the several ingredients of the milk in any way changed.

The present invention contemplates a method of high temperature, short time sterilization whereby the objectionable caramelized flavor is kept at a minimum. The formation of milk stone on the walls of the heater is, to a great degree, eliminated as the natural result of the method employed to prevent caramelization. In the heating of the milk care is taken to prevent boiling of the product at any stage. The milk product under treatment is maintained in motion during the period when the sterilization heat is being applied thereto in such a fashion as to prevent overheating of the milk where it contacts the surface of the heating means.

The present invention contemplates also the application of the heat for sterilization to the milk product in such a fashion as to avoid a breakdown of the heat stability of the milk product. To this end the heating of the milk product is done in graduated stages so that the effect of preheating can be controlled insofar as it influences ultimate heat stability of the product. Furthermore, any centrifugal action of a substantial nature is carefully avoided so as to prevent mechanical separation of the constituents of the milk.

It is specifically a purpose of the invention to provide a method of sterilizing fluid (liquid and semi-liquid) products and especially milk products by subjecting them to high temperatures for a short time, in which the products throughout their treatment are kept under sufficient pressure to prevent any boiling at the heating surface and are rapidly agitated when the sterilizing heat is being applied so as to change the fluid film contacting the heater surface constantly and prevent overheating at this surface, the agitation being accomplished in a fashion which prevents mechanical separation of the constituents of the products.

The accompanying drawing illustrates in the figure a diagrammatic view of the apparatus necessary to carry out the method of the present invention.

In carrying out the present invention, the fluid product to be treated is introduced into a storage container 1 in any suitable manner, and there it is placed under pressure which is in excess of that necessary to prevent boiling at the high temperature reached in the sterilization treatment. For example, air is introduced in the container 1 over the fluid product through an air inlet 2 until the pressure indicated by gauge 3 is at least 50–100 lbs. Any other suitable means such as a force pump may be used to supply the fluid product under pressure.

The pressure of the air on the top of the fluid in the container 1 will force the fluid out of the container through a conduit 4. The conduit 4 carries the fluid first to a pre-warmer 5 which consists of a loop circuit comprising two pipes 6 and 7 and an agitator pump 8 in a steam heated chamber 9. The chamber 9 is desirably kept at a temperature sufficient to preheat the product to about 220°–240° F. During the preheating period the pump 8, which is a high speed circulating pump, forces the product to circulate repeatedly through the pipes 6 and 7, some additional fluid being continuously forced in from the conduit 4 and added to the product already preheated. The amount of product forced in from the conduit 4 will be discharged from the pipe 7 to a transfer conduit 10. Thus cooler fluid is continuously replacing the heated fluid circulating in the loop and heat is being transferred from fluid to fluid directly. With certain products it may be desirable to employ a plurality of preheating stages. Increased stability and less shock due to sudden temperature change may thus be obtained.

The conduit 10 carries the preheated product to a second loop comprising the interconnected pipes 11 and 12 in a steam chamber 13 and a high speed circulating pump 14. The product is circulated rapidly so as to bring the temperature of the product up to about 265°–280° F. The product is held at the sterilizing temperature of 265°–280° F. for a short period of time by passing the fluid product through a conduit 15 to a holder unit 16, which consists of a steam chamber 17 in which pipe 18 is located. The pipe 18 extends back and forth through the heater chamber 17, there being sufficient length of pipe 18 to maintain the heated product in the chamber 17 for the desired period of time, that is, for five to fifteen seconds. The product is then conducted by a pipe 19 into a cooler chamber 20 and through the loop consisting of two pipes 21 and 22 and a pump 23 where the product is cooled to about 100° to 150° F. The product is then lead to a canning machine 24 where it is placed in cans or other suitable containers.

A highly essential step in the process is the maintenance of the pressure applied to the fluid product in the container 1 throughout the entire heating of the product high enough to prevent boiling and consequent formation of milk stone or other comparable solid substances that tend to adhere to the heating surface in any of the pipes 6, 7, 11 and 18. The product, being maintained under this pressure at all stages of the process, is prevented from burning to produce a cooked flavor because there is no boiling and consequent separation of gases from liquid to produce the ideal condition for burning-on or caramelizing. The high speed agitation of the product in the pre-warmer and in the heater causes continuous intermingling of cooler particles of the product with other particles which have contacted the heated walls of the pipes so that there is little possibility of the film which directly contacts the pipe walls becoming heated too suddenly. The heating of all the fluid is uniformly rapid. Similarly, on cooling the heated product is continuously brought directly into contact with fluid that has already circulated around the loop in the cooling chamber and the heat interchange is largely from fluid to fluid, as well as from the fluid to the pipe walls.

Throughout the entire treatment, the change of temperature of the product is graduated and uniform so as to improve the heat stability thereof. There is little variation in the change in temperature or pressure which would tend to break down the natural colloidal suspension of the solids in a milk product.

In the sterilization process hereinabove described it will be noted that there is little or no centrifugal action of the product in its passage through the sterilizing process. This is of substantial importance because it prevents mechanical separation of the constituents of the product during the sterilization thereof.

In the specific description of the process, we have referred to certain temperatures and pressures. It must be understood that the sterilization temperatures used may vary over a wide range, and of course the time at which the product is held will vary as the temperature used varies. Furthermore, the pressure at which the product is held during its passage through the sterilizer may be varied in accordance with the temperature used. For example, in sterilizing milk at 265°–280° F. the milk product has been held at pressures in excess of 50 lbs. which insured a sufficient margin of safety below the boiling point of the milk product at those pressures. A sterilized product can be produced at these temperatures by maintaining the milk product at such temperature for five to fifteen seconds or less. At lower temperatures the product must be held at the sterilizing temperature for a longer period of time. Each product has a particular temperature and time of sterilization that is best suited to it. In some cases, temperatures as low as 212° F. are sufficient.

In the drawing, the apparatus as shown does not include the usual control valves and other equipment which would be necessary to maintain the several heating and cooling chambers at the proper temperatures and to maintain the proper rate of flow of the product through the sterilizer. These matters are matters of mechanical construction and do not affect the present invention.

It is believed that the invention and its attendant advantages will be understood from the foregoing description. It will be apparent that various changes may be made in the steps and their order of accomplishment in the process described without departing from the spirit and scope of the invention.

Having thus described our invention, what we claim as new and desire to secure by Letters Patent is:

1. A method of sterilizing fluid food products by heat which comprises placing the fluid under a pressure sufficient to prevent boiling at the heating surface at the point of highest temperature, forewarming the fluid in a heated conduit of relatively low temperature, then increasing the temperature of the fluid by rapidly circulating the fluid around a loop in said conduit which is held at sterilizing temperature and gradually introducing the fluid into the loop at one point in the loop and discharging the fluid from the loop at another point in the loop at a rate which is substantially less than the rate at which the fluid circulates in the loop, thereafter holding the fluid at sterilizing temperature for a definite period by passing the same through a portion of said conduit which is held at sterilizing temperature, and thereafter cooling the fluid.

2. A method of sterilizing fluid food products by heat which comprises placing the fluid under a pressure sufficient to prevent boiling of the fluid at the temperatures employed, forewarming the fluid gradually by rapidly circulating the fluid around a loop in a conduit and applying heat to said loop, gradually introducing fluid at one point in said loop and withdrawing it at another point, transferring the withdrawn fluid to a second loop in said conduit, bringing it to sterilizing temperature in said second loop by rapidly circulating the fluid through said loop, gradually withdrawing the fluid from said second loop, holding the fluid at sterilizing temperature by passing it gradually through a section of said conduit which is maintained at sterilizing temperature, and thereafter cooling said fluid.

3. A method of sterilizing fluid food products by heat which comprises initially forewarming the fluid gradually by rapidly circulating the fluid around a loop in a conduit and applying heat to said loop, gradually introducing fluid at one point in said loop and withdrawing it at another point, transferring the withdrawn fluid to a second loop in said conduit, bringing it to sterilizing temperature in said second loop by rapidly circulating the fluid through said loop, gradually withdrawing the fluid from said second loop, holding the fluid at sterilizing temperature by passing it gradually through a section of said conduit which is maintained at sterilizing temperature, maintaining the fluid in the stages of forewarming and sterilizing at pressures sufficient to prevent boiling of the fluid at the temperatures employed, and thereafter cooling said fluid.

4. A method of sterilizing fluid products by heat which comprises placing the fluid under a pressure sufficient to prevent boiling at the heating surface at the point of highest temperature, introducing the cool fluid into a loop conduit which is maintained at a temperature of about 220° to 240° F., rapidly circulating the fluid in said loop conduit, gradually withdrawing fluid from said loop conduit and transferring it to another loop conduit which is maintained at a sterilizing temperature of about 265° to 280° F., rapidly circulating the fluid in said last named loop conduit, and passing the withdrawn fluid through a conduit which is maintained at the sterilizing temperature then gradually cooling the fluid.

GERALD C. NORTH.
VIRGIL C. STEBNITZ.
ALVIN J. ALTON.